Sept. 17, 1935.  T. MADSEN  2,014,501
PISTON RING
Filed July 2, 1934

Inventor:
Tage Madsen
By E. F. Wenderoth
Atty

Patented Sept. 17, 1935

2,014,501

UNITED STATES PATENT OFFICE 2,014,501

PISTON RING

Tage Madsen, Goteborg, Sweden

Application July 2, 1934, Serial No. 733,504
In Sweden October 13, 1933

2 Claims. (Cl. 309—25)

This invention relates to improvements for packing rings in pistons for steam and combustion engines, and more particularly to piston rings which are composed of two slotted rings which have interengaging projections and recesses.

The object of the present invention is to compensate for the wear taking place in the groove for the ring in the piston so that the ring will always completely fill said groove.

It has previously been proposed to provide piston rings with oblique or conical surfaces which will cooperate with elastic rings having corresponding oblique or conical surfaces which because of the pressure exerted have been urged against the respective piston rings and have in turn kept the piston rings pressed against the upper and lower surfaces of the piston groove.

It is an object of the invention to eliminate the use of separate rings and apply the conical surfaces directly upon the coacting component rings forming the packing ring so that these conical surfaces will react with one another so as to keep the piston ring pressed against the upper and lower surfaces of the piston groove. In order to accomplish this end those surfaces of the component rings which abut or rest against each other are made conical. A transverse section through the rings comprising the composite ring forming the subject matter of this invention will show a division line between the two rings which is oblique or inclined.

Figure 1:
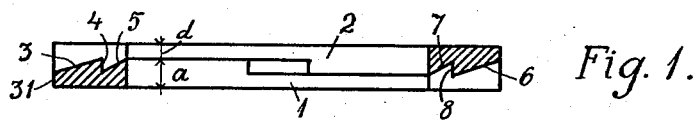
Figure 2:
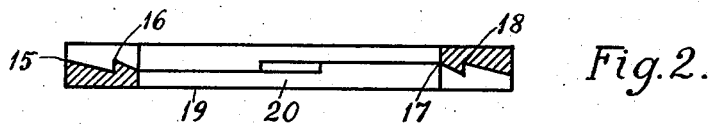
Figure 3:
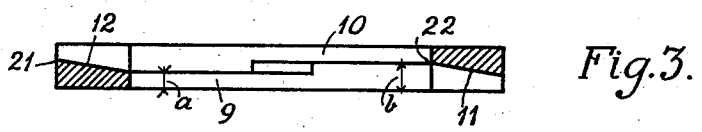
Figure 4:
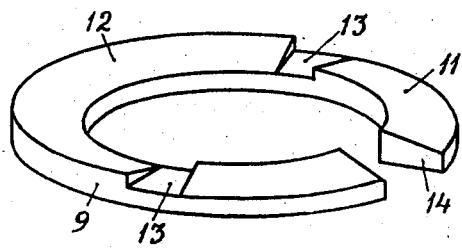
Figure 5:
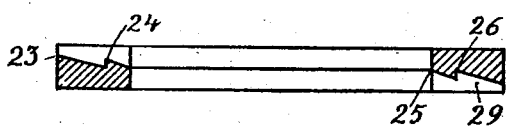
Figure 6:
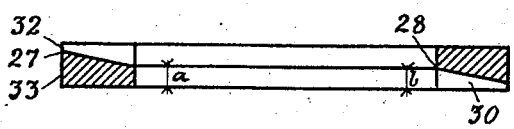

With the above and other objects in view which will become apparent as the description proceeds, the invention comprises the combination and arrangement of parts set forth below, claimed in the claims and shown in the drawing, in which Figure 1 is a transverse diametrical sectional view through a combination or composite packing ring according to the invention, Figure 2 is a similar view through a modification, Figure 3 is a similar view through another modification, Figure 4 shows a perspective view of one of the rings used in the modification shown in Figure 3, Figure 5 is a transverse diametrical sectional view taken through the slots showing a still further modification, and Figure 6 is a similar view through still another modification.

Referring to the drawing it will be noted that in Figure 1 the dividing line between the two component rings 1 and 2 is composed of three parts, namely 3, 4 and 5, of which two are obliquely inclined surfaces which are inclined towards of the axis of the rings, namely surfaces 3 and 5. The intermediate surface 4 is located parallel to the axis of the ring. It will be noted that the two parts 3 and 5 are disposed substantially parallel and the projected foci thereof are located above the ring.

The division line however, diametrically opposite to the surfaces 3, 4 and 5 have the corresponding inclined portions 6 and 7 and these portions are obliquely inclined so that the projected foci thereof will occur below the ring. The above construction may also be expressed in stating that the dividing line between the component ring in a transverse section is congruent to the inverted dividing line at a point diametrically opposite the first dividing line.

The intermediate surface 8 as well as the intermediate surface 4 is constructed substantially parallel to the axis of a ring. It will be noted that due to the surfaces 4 and 8 a sawtooth formation is obtained which will prevent the ends of the rings from projecting outside the outer circumference of the opposite ring.

In Figure 2 a modification is shown wherein the saw-tooth is reversed and in Figure 3 a still further modification is shown in which the two conical surfaces upon either part of the rings may coincide. In Figure 3 the two component rings 9 and 10 are alike and the construction thereof is clearly brought out in the perspective view of Figure 4 wherein the two conical surfaces 11 and 12 meet at the diametrically opposed recesses 13 located half-way between the slot 14 and the back of the ring.

In the modification shown in Figures 1 to 4, the height of the projections on each component ring is the same, that is, the points 15, 16 and 17, 18 in Figure 2 are at the same height above the bottom 19 of the ring 20 and the points 21 and 22 in Figure 3 are also at the same height above the bottom of the ring 9.

These heights have been varied as shown in the modifications illustrated in Figures 5 and 6 where the points 23 and 24 are higher than the points 25 and 26, and in Figure 6 the point 27 is located higher than the point 28. According to these modifications the passage through the slots 29 and 30 is made narrower and thereby causes less loss of pressure during the working stroke of the piston. Exactly the same purpose may be obtained by inclining the lines 11 and 12 in the modification shown in Figure 3 more than the inclination shown in this figure.

However, another reason exists for lowering the point 22 in Figure 3. A certain advantage is gained when the distance $a$ is made equal to or less than the distance $b$ in Figure 3 because the ring must be subjected to a certain amount of treatment or work during the manufacture thereof in order to attain the desired form and the desired pressure against the wall of the cylinder. This treatment is most intense at the back part of the ring and decreases towards the ring end. Therefore the ring should properly be made strong enough to withstand such treatment at the back part thereof, namely in the vicinity where the height $a$ is taken. For this reason the modification shown in Figures 5 and 6 are somewhat preferred over the modifications above described.

If the piston ring groove is worn so that pressure can be exerted behind the ring, that portion of the ring which is wider on the inside will be pressed hardest against the cylinder wall than that portion which is narrower. In the construction shown in Figure 1 the hatched part would thus be pressed outwardly more forcibly than the ends of the superposed ring end and therefore on that account would become more worn upon the outside and move outwardly farther and thereby raise the overlying ring. In other words, when the distance $a$ is larger than the distance the ring 1 will become more worn upon its edge 31 than at the ends and therefore will move outwardly in relation to the ring 2 and raise the latter ring. This operation happens in the same manner at the diametrically opposed point. The narrower the ring edge is at 31, the sooner this effect will take place since at 31 the pressure per square unit becomes greater than on the overlying ring edge.

In Figure 6 where $a=b$ the pressure on the narrower edge 32 becomes greater per square unit than on the wider edge 33 and the wear is therefore greater, causing the ring ends to move outwardly and raising the top ring so as to fill the ring groove.

I claim:—

1. A packing ring composed of two split rings with mutually contacting surfaces of conical shape, said surfaces being so arranged on each component ring that one half of the ring has its conical surface reversed relatively to that on the other half.

2. A packing ring composed of two split rings with mutually contacting surfaces of conical shape, each component ring having more than one conical surface, said conical surfaces lying radially one within another, so as to give a sawtooth-like section in each component ring, said surfaces being so arranged on each component ring, that one half of the ring has its conical surfaces reversed relatively to those on the other half.

TAGE MADSEN.